(12) United States Patent  (10) Patent No.: US 7,947,970 B2
Irisawa et al.  (45) Date of Patent: May 24, 2011

(54) RADIATION DETECTOR

(75) Inventors: Kaku Irisawa, Kanagawa-ken (JP);
Kazuhiro Noda, Kanagawa-ken (JP);
Kenichi Hayashi, Kanagawa-ken (JP);
Katsutoshi Yamane, Kanagawa-ken
(JP); Kiyoteru Miyake, Kanagawa-ken
(JP)

(73) Assignee: Fujifilm Corporation, Tokyo (JP)

( * ) Notice: Subject to any disclaimer, the term of this patent is extended or adjusted under 35 U.S.C. 154(b) by 176 days.

(21) Appl. No.: 12/453,861

(22) Filed: May 26, 2009

(65) Prior Publication Data

US 2009/0294705 A1  Dec. 3, 2009

(30) Foreign Application Priority Data

May 26, 2008  (JP) ................ 2008-136631

(51) Int. Cl.
*G03C 5/16*  (2006.01)
(52) U.S. Cl. ....................................... 250/580
(58) Field of Classification Search ............ 250/580, 250/370.01–370.15, 581, 582; 378/98.8
See application file for complete search history.

(56) References Cited

U.S. PATENT DOCUMENTS

| 3,685,989 | A | | 8/1972 | Galen | |
|---|---|---|---|---|---|
| 5,396,072 | A | * | 3/1995 | Schiebel et al. | 250/370.09 |
| 5,501,755 | A | * | 3/1996 | Dahlquist | 156/153 |
| 5,598,004 | A | * | 1/1997 | Powell et al. | 250/370.09 |
| 5,880,472 | A | * | 3/1999 | Polischuk et al. | 250/370.09 |
| 6,171,643 | B1 | * | 1/2001 | Polischuk et al. | 427/76 |
| 6,546,075 | B1 | * | 4/2003 | Chartier et al. | 378/98 |
| 7,868,309 | B2 | * | 1/2011 | Nariyuki | 250/580 |
| 2001/0015416 | A1 | * | 8/2001 | Isoda | 250/580 |
| 2001/0025933 | A1 | * | 10/2001 | Imai | 250/580 |
| 2003/0223534 | A1 | | 12/2003 | Sato et al. | |
| 2005/0003295 | A1 | * | 1/2005 | Koninckx et al. | 430/139 |
| 2007/0015091 | A1 | * | 1/2007 | Miyake et al. | 430/321 |
| 2007/0099116 | A1 | * | 5/2007 | Miyake | 430/270.1 |
| 2007/0108398 | A1 | * | 5/2007 | Imai | 250/580 |
| 2007/0125953 | A1 | * | 6/2007 | Miyake et al. | 250/370.01 |
| 2008/0210946 | A1 | * | 9/2008 | Okada et al. | 257/71 |
| 2008/0224180 | A1 | * | 9/2008 | Nariyuki | 257/226 |
| 2008/0230710 | A1 | * | 9/2008 | Noda et al. | 250/370.12 |
| 2008/0272320 | A1 | * | 11/2008 | Imai | 250/580 |
| 2008/0283947 | A1 | * | 11/2008 | Imai | 257/428 |
| 2009/0001254 | A1 | * | 1/2009 | Ogawa et al. | 250/208.1 |

* cited by examiner

*Primary Examiner* — David P Porta
*Assistant Examiner* — Kiho Kim
(74) *Attorney, Agent, or Firm* — Jean C. Edwards, Esq.; Akerman Senterfitt LLP

(57) ABSTRACT

A radiation detector is constituted by: a recording photoconductive layer; and electrodes provided on both sides of the photoconductive layer. Electric charges, which are generated within the recording photoconductive layer when radiation is irradiated thereon while a predetermined biasing voltage is being applied between the electrodes, are read out as electric signals. The recording photoconductive layer is formed by amorphous selenium that contains alkali metal elements within a range from 0.0007 atomic ppm to 0.0035 atomic ppm.

3 Claims, 5 Drawing Sheets

RADIATION DETECTOR

CROSS-REFERENCE TO RELATED APPLICATION

This application claims the benefit of Japanese Patent Application 136631/2008, filed May 29, 2008, the disclosure of which is incorporated herein by reference in its entirety.

BACKGROUND OF THE INVENTION

1. Field of the Invention

The present invention is related to a radiation detector which is suited to application to radiation imaging apparatuses, such as X-ray imaging apparatuses.

2. Description of the Related Art

Currently, various X-ray imaging apparatuses that employ solid state radiation detectors (having semiconductors as the main portions thereof) as X-ray image information recording means have been proposed and are in practical use in the field of X-ray (radiation) imaging for the purposes of medical diagnosis and the like.

Various types of radiation detectors to be employed by the X-ray imaging apparatuses have been proposed. From the viewpoint of a charge generating process for converting X-rays to electric charges, there are radiation detectors of the optical conversion type (indirect conversion type), and radiation detectors of the direct conversion type. In a radiation detector of the indirect conversion type, fluorescence generated from phosphors due to the irradiation of radiation is detected by a photoconductive layer. Signal charges obtained by the photoconductive layer are temporarily accumulated. Then, the accumulated charges are converted to image signals (electric signals) and output. In a radiation detector of the direct conversion type, electric charges are generated within a photoconductive layer due to irradiation of X-rays. These signal charges are collected by charge collecting electrodes, and temporarily accumulated in a charge accumulating section. The accumulated charges are converted into electric signals and then output.

There are two main types of methods for reading out accumulated electric charges as well. One is an optical readout method that irradiates detectors with readout light (readout electromagnetic waves) to perform readout. The other is a TFT readout method that scans and drives TFT'S (Thin Film Transistors) which are connected to charge accumulating sections, to read out the accumulated charges.

The radiation detectors described above generate electric charges corresponding to X-ray energy when X-rays are irradiated onto charge generating layers provided in the detectors. The generated electric charges are read out as electric signals, and the aforementioned photoconductive layer functions as a charge generating layer. Conventionally, materials such as amorphous selenium (a-Se), PbO, $PbI_2$, $HgI_2$, $BiI_3$, and Cd(Zn)Te have been used to form photoconductive layers.

Forming a-Se layers having large areas is possible by utilizing thin film forming techniques such as vacuum vapor deposition. However, there is a trend for many structural faults to be included therein due to the amorphous nature of a-Se, which leads to deterioration of sensitivity. It is common to dope a-Se with an appropriate amount of impurities, to improve the performance characteristics thereof. For example, U.S. Patent Application Publication No. 20030223534 discloses a recording photoconductive layer formed by a-Se doped with an alkali metal within a range from 0.01 ppm to 10 ppm. As another example, U.S. Pat. No. 3,685,989 discloses a recording photoconductive layer formed by a-Se doped with Na at 100 ppm.

The positive hole transport properties of a-Se were sufficient, because it is a P type semiconductor. Therefore, it had been considered that improving the electron transport properties of a-Se was necessary to obtain high sensitivity. U.S. Patent Application Publication No. 20030223534 and U.S. Pat. No. 3,685,989 both disclose a-Se having improved electron transport properties, by being doped with Na. The improved electron transport properties were obtained as a result of reduction of electron capturing centers from among the charge faults of a-Se.

However, in order to further improve sensitivity, it is necessary to improve not only the electron transport properties but the positive hole transport properties as well, in order to transport generated charges to the electrodes at both sides of the photoconductive layer. As a result of investigation by the present inventors, it was discovered that positive hole transport properties could be improved while maintaining high electron transport properties, by doping a-Se with alkali metals at a predetermined low concentration.

SUMMARY OF THE INVENTION

The present invention has been developed in view of the foregoing circumstances. It is an object of the present invention to provide a radiation detector, that has greatly improved positive hole transport properties, while high electron transport properties are maintained.

A radiation detector of the present invention comprises:

a recording photoconductive layer; and electrodes provided on both sides of the photoconductive layer;

electric charges, which are generated within the recording photoconductive layer when radiation is irradiated thereon while a predetermined biasing voltage is being applied between the electrodes, being read out as electric signals; and characterized by:

the recording photoconductive layer being formed by amorphous selenium that contains alkali metal elements within a range from 0.0007 atomic ppm to 0.0035 atomic ppm.

It is preferable for the alkali metal elements to be doped at a concentration within a range from 0.0007 atomic ppm to 0.003 atomic ppm, and further at a concentration within a range from 0.0007 atomic ppm to 0.002 atomic ppm. The amount of doped alkali metal elements refers to a state in which the alkali metal elements are included within the above ranges at all portions of the recording photoconductive layer. However, a thin layer that does not include alkali metal elements may be provided, as long as the function of the recording photoconductive layer is not hindered.

It is preferable for the recording photoconductive layer to further contain As within a range from 0.1 atomic % to 0.5 atomic %. Here, the amount of contained As refers to a state in which As is included within the above range at all portions of the recording photoconductive layer. However, a thin layer that does not include As may be provided, as long as the crystallization preventing function of As is not hindered.

A layer formed by amorphous selenium may be provided adjacent to the recording photoconductive layer at least one side thereof, having a thickness within a range from 0.2 μm to 2 μm and containing As within a range from 2 atomic % to 14 atomic %.

The radiation detector of the present invention comprises the recording photoconductive layer and the electrodes provided on both sides of the recording photoconductive layer. In the radiation detector of the present invention, electric charges, which are generated within the recording photoconductive layer when radiation is irradiated thereon while a predetermined biasing voltage is being applied between the electrodes, are read out as electric signals. The recording photoconductive layer is formed by amorphous selenium that contains alkali metal elements within a range from 0.0007 atomic ppm to 0.0035 atomic ppm. Therefore, the positive hole transport properties can be greatly improved while maintaining high electron transport properties. The electron transport properties are improved over pure selenium, which is said to have great fluctuations in electron transport properties, and further, the positive hole transport properties are improved, resulting in a radiation detector which is superior in charge transport properties.

In addition, it is preferable for the recording photoconductive layer to be doped with As, which has a crystallization preventing function. This is because the crystallization temperature of pure selenium and selenium doped with alkali metals is low, these materials crystallize easily, and the cores of crystallization are often generated during vapor deposition. A radiation detector which is superior in durability can be obtained, by causing the recording photoconductive layer to further contain As within a range from 0.1 atomic % to 0.5 atomic %, or by providing a layer formed by amorphous selenium adjacent to the recording photoconductive layer at least one side thereof, having a thickness within a range from 0.2 µm to 2 µm and containing As within a range from 2 atomic % to 14 atomic %.

BEST MODE FOR CARRYING OUT THE INVENTION

There are two types of radiation detectors from the viewpoint of converting radiation to electric charges. Those of the direct conversion type directly convert radiation to electric charges, which are accumulated. Those of the indirect conversion type convert radiation into light with a scintillator formed by CsI:Tl, $Gd_2O_2S$:Tb or the like, convert the light to electric charges with a-Si photodiodes or the like, then accumulate the electric charges. The radiation detector of the present invention may be employed as a direct conversion type radiation detector or an indirect conversion type radiation detector, as long as a-Se is employed in a layer that converts radiation or light to electric charges. Note that thicker a-Se layers are employed in radiation detectors of the direct conversion type, and therefore the advantageous effects of the present invention will be more pronounced.

In addition, there are two types of radiation detectors from the viewpoint of readout methods. The radiation detector of the present invention may be employed as a radiation image detector that employs the optical readout method, in which semiconductor materials that generate electric charges when irradiated with light are utilized to read out radiation images. Alternatively, the radiation detector of the present invention may be employed as a radiation detector that employs the TFT readout method, in which, electric charges which are generated by irradiation of radiation are accumulated, then accumulated electric charges are read out by turning TFT's (Thin Film Transistors) ON/OFF pixel by pixel.

Figure 1:
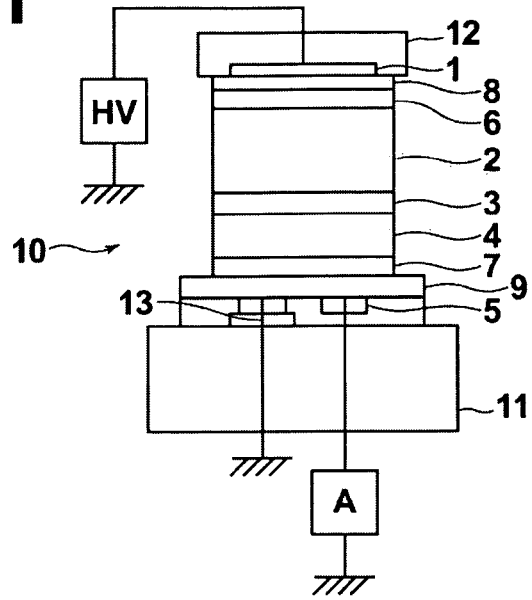
FIG. 1 is a sectional diagram that illustrates the schematic construction of a radiation detector according to a first embodiment of the present invention.

Hereinafter, a radiation detector that employs the optical readout method will be described. FIG. 1 is a sectional diagram that illustrates the schematic construction of a radiation detector 10 according to a first embodiment of the present invention.

The radiation detector 10 comprises: an upper electrode 1 which is transmissive with respect to recording radiation; a recording photoconductive layer 2 that exhibits conductivity when irradiated by the radiation transmitted through the upper electrode 1; a charge accumulating layer 3 that functions substantially as an insulator with respect to charges which are charged at the upper electrode 1 (latent image polarity charges: negative electric charges, for example) and functions substantially as a conductor with respect to electric charges of the opposite polarity (transport polarity charges: in the case described above, positive electric charges); a readout photoconductive layer 4 that exhibits conductivity when irradiated by readout light; and second electrodes 5, which are transmissive with respect to electromagnetic waves. The above components are stacked on a glass substrate 11.

Crystallization preventing layers 6 and 7 are provided between the recording photoconductive layer 2 and the upper electrode 1, and between the readout photoconductive layer 4 and the second electrodes 5, respectively, to prevent crystallization at the interfaces thereof. An upper coating layer 8 having rectifying properties is provided between the crystallization preventing layer 6 and the upper electrode 1. A lower coating layer 9 is provided between the crystallization preventing layer 7 and the second electrodes 5. The upper coating layer 8 and the lower coating layer 9 are provided to reduce dark current and current leaks. In addition, a surface protecting layer 12 is provided on the upper surface of the upper electrode 1, to prevent creeping discharge. Further, a light shielding layer 13 (color filter layer) that transmits light of only desired wavelengths is formed underneath the lower electrodes 5 via a transparent organic insulating layer.

The recording photoconductive layer 2 is formed by a-Se that contains alkali metal elements at a concentration within a range from 0.0007 atomic ppm to 0.0035 atomic ppm. The point that the a-Se that constitutes the recording photoconductive layer 2 contains the alkali metal elements at a concentration within a range from 0.0007 atomic ppm to 0.0035 atomic ppm will be described. Note that γ rays and a rays may be utilized as radiation, as alternatives to X rays. Here, however, a description will be given for a case in which X rays are utilized as the radiation.

The thickness of the recording photoconductive layer 2 is preferably within a range from 100 µm to 200 µm in the case that an a-Se compound is used as the material. It is particularly preferable for the thickness of the photoconductive layer 2 to be within a range from 150 μm to 250 μm in the case that the radiation detector 10 is used for mammography, and to be within a range from 500 μm to 1200 μm in the case that the radiation detector 10 is used for general imaging purposes.

X ray absorption rates are determined by the constitutive elements and the thicknesses of recording photoconductive layers. In the case that an a-Se recording photoconductive layer is utilized for mammography, 90% or greater of irradiated X ray energy is absorbed at a layer thickness of 200 μm, and 80% or greater of irradiated X ray energy is absorbed at a layer thickness of 100 μm. Therefore, the thickness of the recording photoconductive layer 2 is set to 170 μm, at which a sufficient amount of X ray energy can be absorbed.

The most important function of recording photoconductive layers is to efficiently transport electrons and positive holes, which are generated by X ray absorption, to an electron accumulating layer and an upper crystallization preventing layer (Au electrode), without the generated charges remaining within the recording photoconductive layers. The transport efficiency depends on the transport properties of recording photoconductive layers with respect to electrons and positive holes. Average ranges (defined as a product of motility, life, and electric field and expressed as distances) of electrons and positive holes are evaluated by TOF (Time Of Flight) measurements. The electric field which is applied when deriving charge ranges is designated as 10 V/μm, which is the electric field when a radiation detecting device is being driven.

Figure 2:
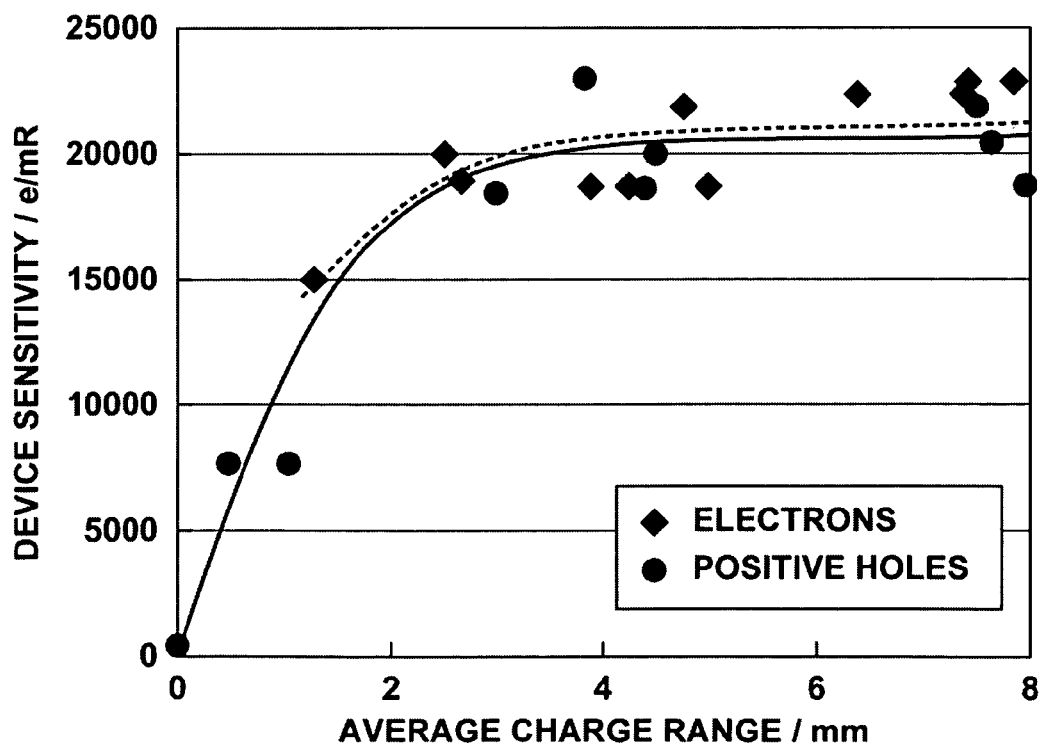
FIG. 2 is a graph that illustrates the relationship between device sensitivity and average electron/positive hole ranges.

FIG. 2 is a graph that illustrates the dependency of device sensitivity on average electron/positive hole ranges, in which plotting of ranges of electrons (positive holes) is applied only to devices in which the ranges of positive holes (electrons) is greater than 3 mm, in order to clarify the relationship between device sensitivity and average charge ranges in a-Se:Na systems. As can be clearly understood from the graph of FIG. 2, device sensitivity is improved along with increases in average ranges of electric charges, and becomes saturated when the average ranges of electrons and positive holes are approximately 4 mm. That is, it is desirable for the average ranges of electrons and positive holes to be 3 mm or greater, in order to obtain sufficient efficiency in converting X ray information into electric charge information. Note that sufficient efficiency can also be obtained in cases that general purpose imaging is performed, if the average range is 3 mm or greater.

Figure 3:
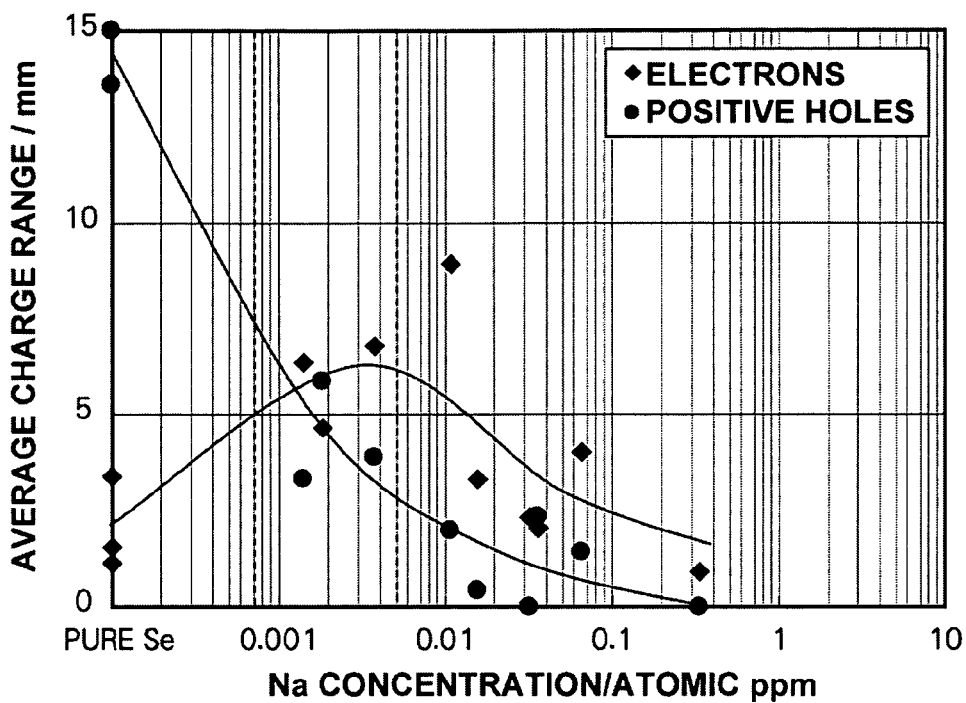
FIG. 3 is a graph that illustrates the relationship between Na concentrations and average ranges of electrons and positive holes.

FIG. 3 is a graph that illustrates the relationship between Na concentrations and average ranges of electrons and positive holes. The average ranges of electrons and positive holes when a pure Se film is employed are illustrated where the horizontal axis and the vertical axis of the graph of FIG. 3 intersect (the left end of the horizontal axis). Because it is not possible to measure the Na concentration of pure Se due to the Na concentration being less than a lower measurable detection limit, values at the portion of the graph of FIG. 3 which is close to pure Se (the portion which is close to the vertical axis) are estimated. However, from the viewpoint of charge transport properties, it can be seen that the electron transport properties increase and the positive hole transport properties decrease when the Na concentration is 0.0007 atomic ppm or greater. It can also be seen that average charge ranges of 3 mm can be secured for both electrons and positive holes when the Na concentration is within a range from 0.0007 atomic ppm to 0.0035 atomic ppm (the range between the dotted lines in the graph of FIG. 3). Accordingly, the range of Na concentrations that provides the best balance between the transport properties of electrons and positive holes is from 0.0007 atomic ppm to 0.0035 atomic ppm, and radiation detectors having the greatest sensitivities can be obtained within this range.

Figure 4:
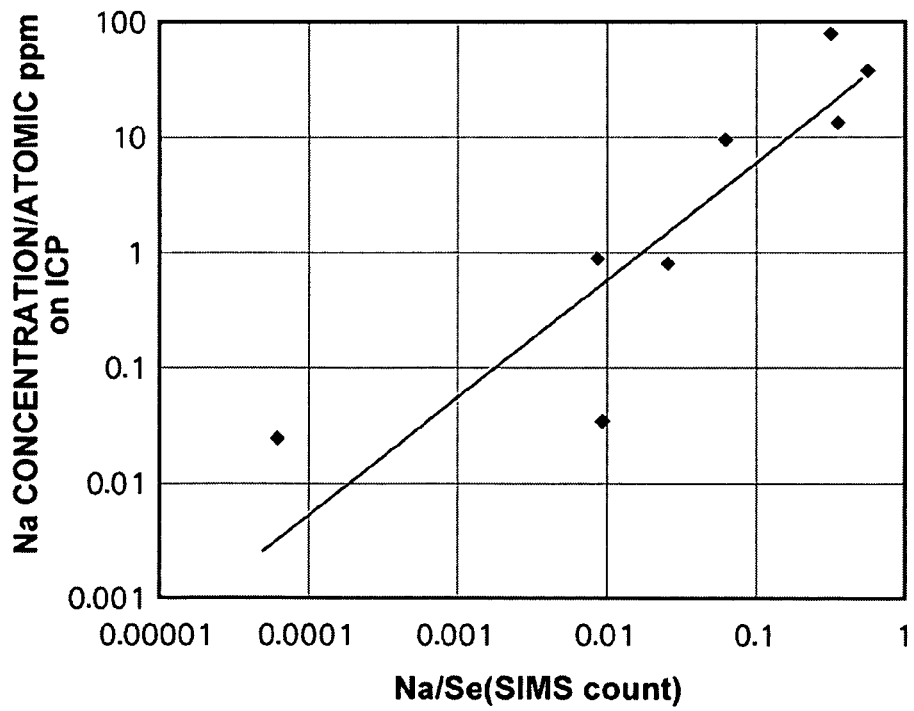
FIG. 4 illustrates a calibration curve for determining Na concentrations from SIMS intensities.

Note that absolute values of Na concentrations can be obtained with respect to samples within the same film forming batch for vapor deposited films. Two types of methods, ICP-MS which has low sensitivity, and QSIMS, which has high sensitivity but is only capable of obtaining relative values for concentrations, were used to measure the Na concentrations. In the ICP-MS method, the surfaces of a-Se:Na vapor deposition samples were washed with 10 ml of ultrapure water, then dissolved by etching with nitric acid. Constant volumes of the dissolved solutions were designated as test samples, and the concentration was measured. In the QSIMS method, a primary ion species was $O^{2+}$, primary ion energy was 3000 eV, primary ion current was 250 μA, a secondary ion species was $^{80}Se$, and a quadrupole secondary ion mass analyzer was employed to detect the intensity of $^{23}Na$. Under these conditions, a profile in the depth direction was obtained for each secondary ion intensity value (count number per second). The count numbers of $^{80}Se$ and $^{23}Na$/second at regions having depths of 10 μm or greater and at which the Na intensities were stable were designated as the Na concentrations measured by the QSIMS method. By measuring a plurality of samples, a calibration curve between the ICP-MS method and the QSIMS method was obtained, as illustrated in FIG. 4. A relationship of: Na concentration (atomic ppm)=$^{23}Na/^{80}Se$ (QSIM count value ratio)·50 was estimated, and estimated Na concentrations (atomic ppm) were obtained.

Figure 5:
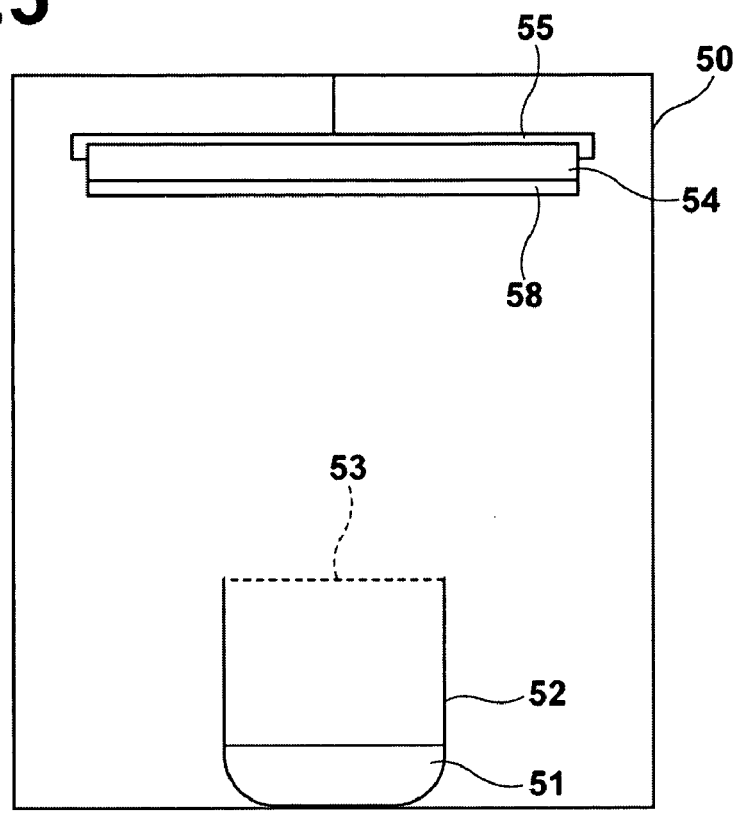
FIG. 5 is a schematic sectional view that illustrates a vacuum vapor deposition apparatus for producing recording photoconductive layers.
Figure 6:
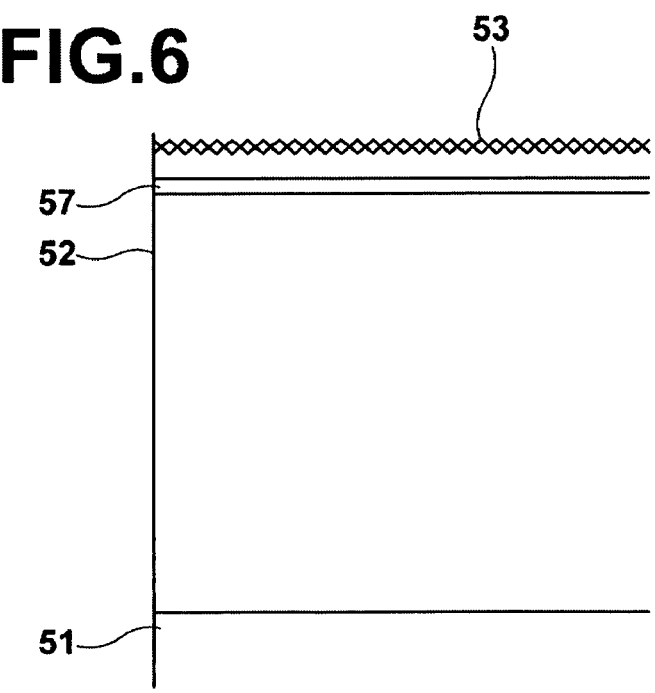
FIG. 6 is a partial magnified sectional view of a vaporizing container of the vacuum vapor deposition apparatus of FIG. 5.

A recording photoconductive layer formed by a-Se that contains alkali metal elements within a range from 0.0007 atomic ppm to 0.0035 atomic ppm can be produced by the vacuum vapor deposition apparatus illustrated in FIG. 5, for example. FIG. 5 is a schematic sectional view that illustrates a vacuum vapor deposition apparatus 50 for producing recording photoconductive layers. FIG. 6 is a partial magnified sectional view of a vaporizing container 52. The vacuum vapor deposition apparatus 50 is constituted by: the vaporizing container 52, in which selenium 51 that contains Na is stored as a vapor source; a mesh filter 53 provided above the vaporizing container 52; and a holding member 55 for holding a substrate 54 onto which vapor deposition is performed. A heater 57 is provided beneath the mesh filter 53, to control the temperature thereof.

A metal mesh, such as those formed by stainless steel, tantalum, molybdenum, and tungsten, or a ceramic mesh may be employed as the mesh filter. It is preferable for the mesh count to be within a range from #100 to #625 per inch. Examples of methods for controlling the temperature of the mesh filter include: mesh conduction; use of a sheath heater, in which a heating element (nichrome wire, for example) surrounded by an insulating material that has good heat conductivity (magnesium oxide, for example) is held in a metal sheath; and use of an oil cooled pipe. Note that it is also possible to control the temperature of the mesh by providing a separate heater above the vaporizing container 52.

The vapor deposition method to be employed is not particularly limited. Vapor deposition methods such as rotating vapor deposition and the linear conveyance method may be employed. The selenium 51 is heated within the vaporizing container 52 by a heat source (not shown) which is connected to the vaporizing container 52, to generate a selenium vapor stream. The vapor stream passes through the mesh filter 53, of which the temperature is being controlled by the heater 57, and adheres to the substrate 54, to form a vapor deposited selenium layer 58.

The average range of electrons exhibits local maximums with respect to mesh temperatures, and average range of positive holes exhibits a tendency to increase monotonously along with decreases in mesh temperature. Accordingly, it is possible to maintain the transport properties of both electrons and positive holes at 3 mm or greater, by controlling the temperature of the mesh to be within a predetermined range.

Note that here, a case has been described in which selenium that contains Na is used as the raw material of the vapor source. Alternatively, selenium that does not contain Na may be used as the raw material of the vapor source, and a vaporizing container, of which the surface has been modified with a compound that contains Na, may be employed, to form the vapor deposited selenium layer 58.

Figure 7:
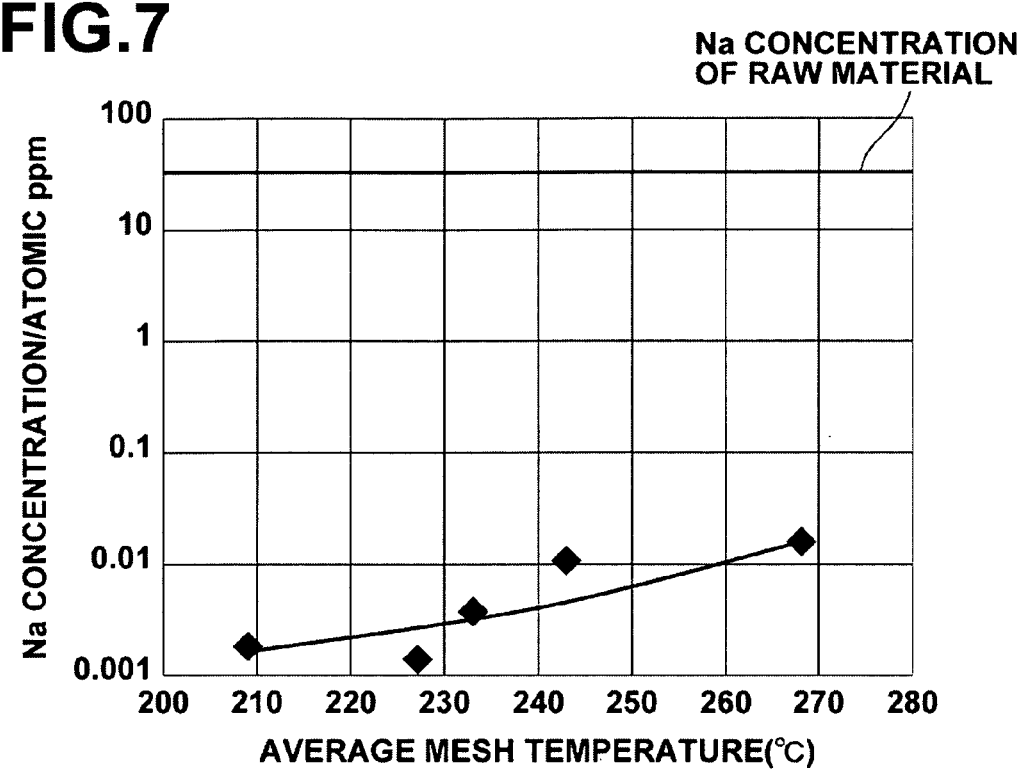
FIG. 7 is a graph that illustrates the relationship between average mesh temperatures and amounts of Na in films.
Figure 8:
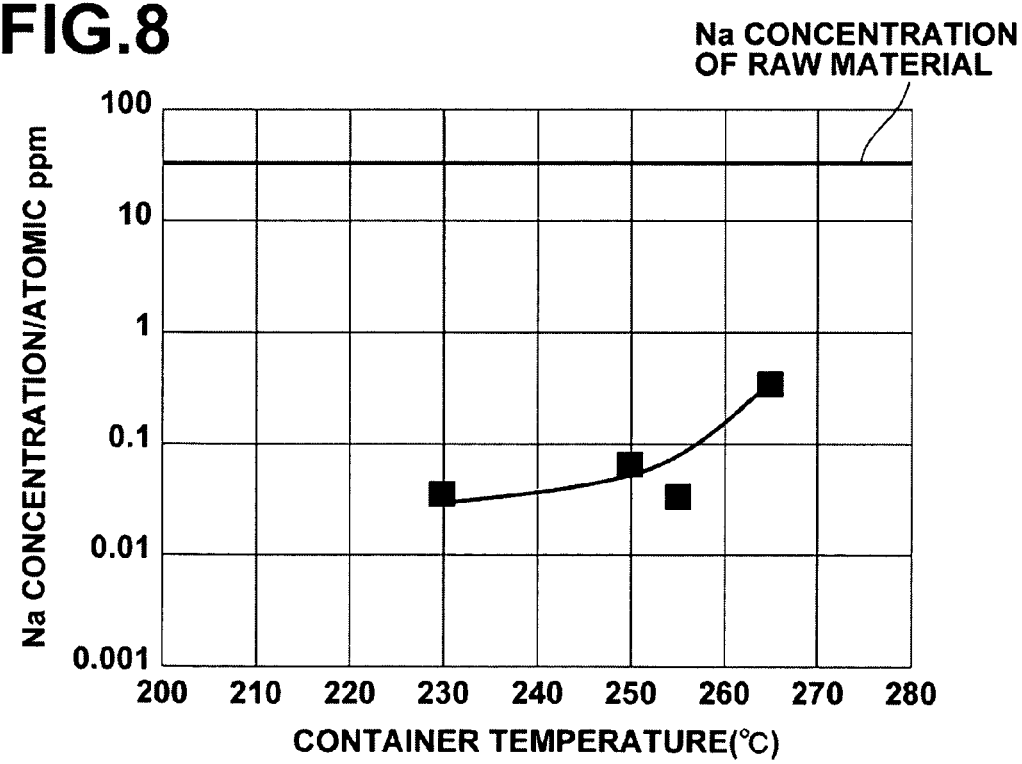
FIG. 8 is a graph that illustrates the relationship between temperatures of the vaporizing container and amounts of Na in films.

FIG. 7 is a graph that illustrates the relationship between average temperatures of the mesh and amounts of Na in films, in the case that the vacuum vapor deposition apparatus illustrated in FIG. 5 is employed and the temperature of the mesh is controlled. FIG. 8 is a graph that illustrates the relationship between temperatures of the vaporizing container 52 and amounts of Na in films, in the case that the mesh filter 53 and the heater 57 are removed from the vacuum vapor deposition apparatus illustrated in FIG. 5 and the temperature of the vaporizing container 52 is controlled. Note that in cases that the mesh temperature is too low, the mesh will become clogged during vaporization, and film forming efficiency decreases, which results in problems such as films of desired thicknesses not being able to be obtained. Therefore, the mesh temperature is measured from approximately 210° C. In addition, the interior of the vaporizing container is heated to 255° C.

As is clear from the graphs of FIG. 7 and FIG. 8, the Na concentration in the vapor deposition raw material is 32 atomic ppm. In the case that no mesh is employed, the Na concentration within the vapor deposited film is within a range from 0.03 atomic ppm to 0.4 atomic ppm, which is a decrease of approximately two and a half orders of ten. In the case that the mesh is employed, the Na concentration within the vapor deposited film decreases by another order of ten, and becomes within a range from 0.002 atomic ppm to 0.02 atomic ppm.

Accordingly, a recording photoconductive layer formed by a-Se containing alkali metal elements at a concentration within the range from 0.0007 atomic ppm to 0.0035 atomic ppm can be produced by using a mesh filter during vapor deposition, and controlling the temperature of the mesh filter. Note that if the Na concentration within the vapor deposition raw material is decreased by an order of 10 or greater to approximately several atomic ppm, the recording photoconductive layer can be produced without employing the mesh filter.

It is known that the crystallization temperature of pure selenium and selenium doped with alkali metals is low, and that these materials crystallize easily. The cores of crystallization are often generated by bumping and inclusion of impurities during vapor deposition. Therefore, it is preferable for the recording photoconductive layer to be doped with As, which has a crystallization preventing function, in addition to the alkali metal elements. It is preferable for the recording photoconductive layer to contain As within a range from 0.1 atomic % to 0.5 atomic %. Table 1 below lists the electron range/positive hole range (in mm) and sensitivities of an a-Se:Na type device (device 1, does not contain As) and a-Se:Na, As type devices (devices 2 through 4, containing As at different concentrations). It is possible to improve the durability of devices by having them contain As at a concentration of 0.1 atomic % or greater, but it can be understood from Table 1 that the sensitivity gradually decreases along with increases in the concentration of As. Accordingly, it is preferable for the concentration of As to be within a range from 0.1 atomic % to 0.5 atomic %, in order to secure both durability and sensitivity.

TABLE 1

|  | As Concentration (Atomic %) | Electron Range/Positive Hole Range (mm) | Sensitivity (e/mR) |
| --- | --- | --- | --- |
| Device 1 | 0 | 5.6/9.0 | 21000 |
| Device 2 | 0.1 | 4.9/5.3 | 20000 |
| Device 3 | 0.3 | 3.2/3.1 | 19000 |
| Device 4 | 0.8 | 1.6/1.2 | 17500 |

A recording photoconductive layer that contains As at a concentration within a range from 0.1 atomic % to 0.5 atomic % can be produced in a manner similar to that for producing the aforementioned recording photoconductive layer that contains alkali metal elements at a concentration within the range from 0.0007 atomic ppm to 0.0035 atomic ppm. Selenium containing Na is heated in the vaporizing container 52 of the vacuum vapor deposition apparatus illustrated in FIG. 5 as a raw material for vapor deposition, while at the same time, $As_2Se_3$ or an Se—As alloy is heated in a separate vaporizing container at a temperature that enables obtainment of a desired As concentration, to perform vapor deposition of both materials simultaneously.

Figure 9:
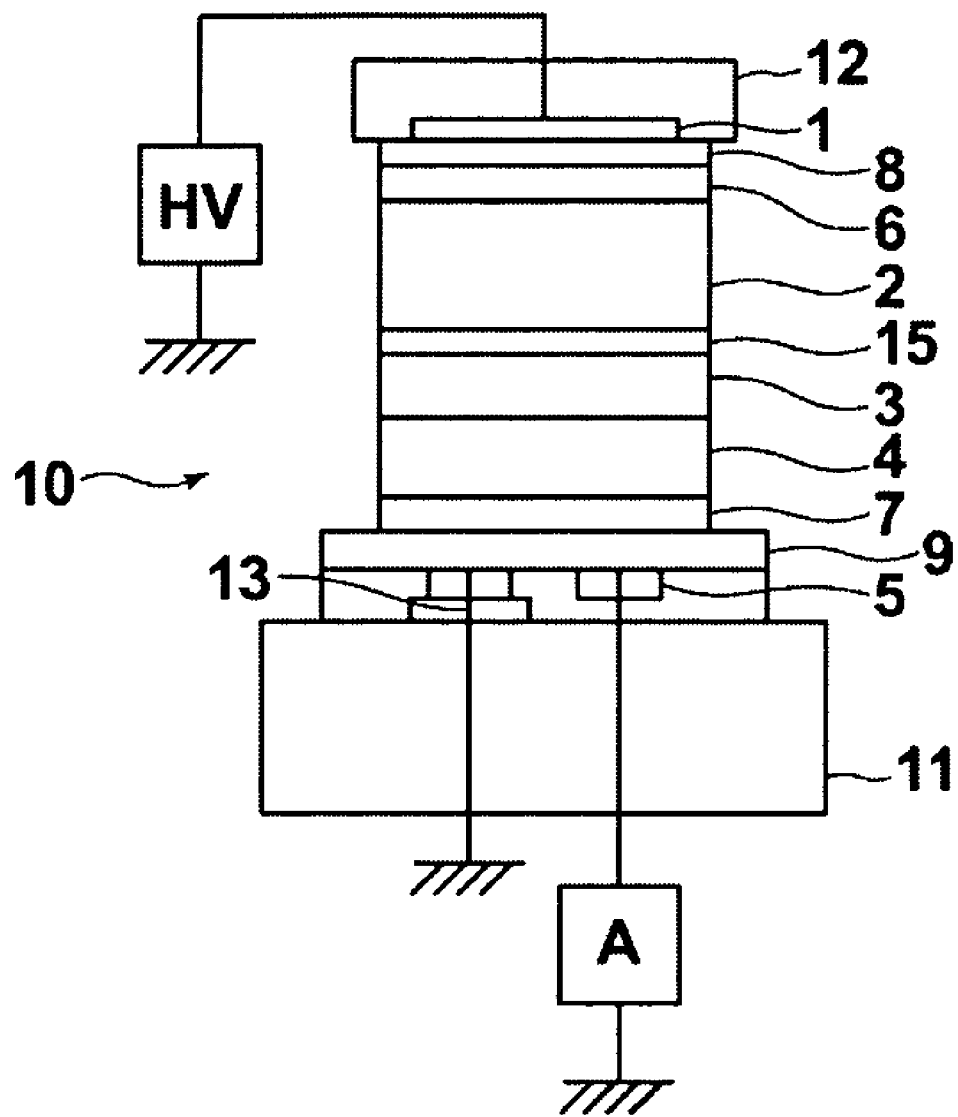
FIG. 9 is a sectional view that illustrates the schematic construction of a radiation detector according to a second embodiment of the present invention.

FIG. 9 is a schematic sectional view that illustrates the structure of a radiation detector according to a second embodiment of the present invention. In FIG. 9, elements which are the same as those illustrated in FIG. 1 are denoted with the same reference numerals, and detailed descriptions thereof will be omitted insofar as they are not particularly necessary. In the radiation detector 10 illustrated in FIG. 9, a layer 15 (hereinafter, referred to as "adjacent layer 15") formed by amorphous selenium, having a thickness within a range from 0.2 μm to 2 μm and containing As within a range from 2 atomic % to 14 atomic %, is provided adjacent to the recording photoconductive layer 2 at one side thereof. Crystal cores are likely to be generated particularly at the interface of the recording photoconductive layer 2 at which the adjacent layer 15 is positioned. This is due to various factors, such as: amorphous layers are likely to be unstable at interfaces from a free energy viewpoint; the possibility that foreign matter will become attached onto the surface onto which vapor deposition is administered prior to initiation of vapor deposition is high; and that bumping occurs because degassing components of the raw material are likely to be included during initiation of vapor deposition. Crystallization can be suppressed by simultaneously doping As into the vicinity of such interfaces.

The durability of the radiation detector 10 can be improved without deteriorating sensitivity and with image faults due to crystallization occurring at lower frequency, by setting the layer thickness of the adjacent layer 15 to be within the range from 0.2 μm to 2 μm and by the adjacent layer 15 containing As at a concentration within a range from 2 atomic % to 14 atomic %. In the case that the layer thickness of the adjacent layer 15 is less than 0.2 μm, 0.15 μm for example, image faults increase drastically after continuous driving, which is not favorable. In the case that the layer thickness of the adjacent layer 15 is greater than 2 μm, the effect of suppressing image faults does not improve, while the thickness of the layer having deteriorated charge transport properties becomes too great. This causes a deterioration in sensitivity, because electrons are prevented from reaching the charge accumulating layer 3, which is not favorable. In addition, in the case that the concentration of As is less than 1 atomic %, an improvement in durability is not realized. In the case that the concentration of As is 15 atomic %, charge injection from the interface is promoted, which deteriorates image quality and is not favorable.

Note that in the example illustrated in FIG. 9, the adjacent layer 15 is formed adjacent to the recording photoconductive layer 2 toward the side of the charge accumulating layer 3. Alternatively, the adjacent layer 15 may be formed adjacent to the recording photoconductive layer 2 toward the side of the crystallization preventing layer 6. In this case, the crystallization preventing layer 6 is not necessary, because the adjacent layer 15 functions as a crystallization preventing layer.

The adjacent layer 15 may be produced by simultaneous vapor deposition using an Se vapor deposition source as the main component of the adjacent layer 15, and an As vapor deposition source. The adjacent layer 15 may be produced by maintaining a constant rate of vapor deposition for the Se, which is the main component, and by controlling the vapor deposition temperature of the As appropriately with respect to time.

Note that the layer thickness of the adjacent layer 15 or the concentration of As therein may be derived from the set vapor deposition rates, by measuring each of the vapor deposition sources. Alternatively, the As concentration may be measured while etching in the depth direction with a constant etching rate in XPS measurement, the etching rate may be obtained from the final etched depth, and the thickness can be measured by obtaining depth position information. Favorable correspondence can be obtained between the thickness of the two.

Hereinafter, the other layers of the radiation detector will be described.

(Upper Electrode)

The upper electrode 1 may be formed by any material as long as it transmits radiation, and thin metal films are preferred examples. Examples of such materials include: Au; Ni; Cr; Pt; Ti; Al; Cu; Pd; Ag; Mg; 3 to 20% MgAg alloys; Mg—Ag intermetallic compounds; 3 to 20% MgCu alloys; and Mg—Cu intermetallic compounds. Au, Pt, and Mg—Ag intermetallic compounds are particularly favorable for use as the material of the upper electrode 1. In the case that Au is used, for example, the thickness of the upper electrode 1 is preferably within a range from 15 nm to 200 nm, and more preferably within a range from 30 nm to 100 nm. In the case that 3 atomic % to 20 atomic % MgAg alloys are used, the thickness of the upper electrode 1 is preferably within a range from 100 nm to 400 nm.

The upper electrode 1 may be formed by any desired method, but it is preferable for the upper electrode 1 to be formed by vapor deposition employing electrical resistance heating. For example, a mass of metal may be melted within a boat by the resistance heating method, then a shutter may be opened to perform vapor deposition for 15 seconds, then the deposited film may be cooled. The above operations may be repeated a plurality of times until the resistance value of the metal film becomes sufficiently low.

(Charge Accumulating Layer)

The charge accumulating layer 3 may be formed by any material, as long as it is insulative with respect to electric charges of a polarity which is desired to be accumulated, and conductive with respect to electric charges of the opposite polarity. Examples of materials for the charge accumulating layer 3 include chalcogenide compounds, such as: $As_2S_3$; $Sb_2S_3$; ZnS; $As_2Se_3$; and $Sb_2Se_3$, organic polymers, such as: organic acrylic resins; polyimides; BCB; PVA; acrylics; polyethylenes; polycarbonates; and polyether imides; oxides, and fluorides. Further, it is preferable for the material to be insulative with respect to electric charges of a polarity which is desired to be accumulated, and conductive with respect to electric charges of the opposite polarity. It is preferable for a difference of $10^3$ or greater to be present between the products of motility and life of charges of the two polarities.

Examples of preferred chalcogenide compounds include: $As_2Se_3$; $As_xSe_{1-x}$ (15≦x≦55); $As_2Se_3$ doped with Cl, Br, and I at a concentration within a range from 500 ppm to 20000 ppm; $As_2Se_3$ in which up to 50% of Se is replaced with Te; $As_2Se_3$ in which up to 50% of Se is replaced with S; $As_2Se_3$ in which the concentration of As is varied ±15%; and amorphous Se—Te, in which the concentration of Te is within a range from S atomic % to 30 atomic %. In the case that materials containing the aforementioned chalcogenides are employed, it is preferable for the thickness of the charge accumulating layer 3 to be within a range from 0.4 μm to 3.0 μm, and more preferably within a range from 0.5 μm to 2.0 μm. The charge accumulating layer 3 may be formed by a single film forming operation, or by a plurality of film forming operations.

Preferred organic films for the charge accumulating layer 3 include polymers such as: organic acrylic resins; polyimides; BCB; PVA; acrylics; polyethylenes; polycarbonates; and polyether imides, doped with charge transporting materials. The charge transporting materials may be selected from among molecules of: tris(8-quinolinolato) aluminum (Alq3); N,N'-diphenyl-N,N'-di(m-tolyl) benzene (TPD); polyparaphenylene vinylene (PPV); polyalkyl thiophene; polyvinyl carbazole (PVK); metallic phthalocyanine; (4-dicyano methylene)-2-methyl-6-(p-dimethyl aminostyryl)-4H-pyrane (DCM); liquid crystal molecules; hexapentiroxy triphenylene; discotic liquid crystals having central cores that contain π conjugated condensed rings or transition metals; carbon nanotubes; and fullerenes. The amount of molecules to be doped can be set within a range from 0.1 wt % to 50 wt %. In the case that the organic polymer materials are employed, it is preferable for the thickness of the charge accumulating layer 3 to be within a range from 0.1 μm to 1.5 μm.

(Readout Photoconductive Layer)

The readout photoconductive layer 4 is formed by a photoconductive substance that exhibits conductivity when irradiated with electromagnetic waves, and visible light in particular. The substance is preferably a semiconductor having an energy gap within a range from 0.7 eV to 2.5 eV, with a compound having at least one of: an amorphous selenium compound; amorphous Si; crystal Si; ZnO; ZnS; ZnSe; ZnTe; PbO; CdS; CdSe; CdTe; and GaAs. In the case that a photoconductive material having an amorphous selenium compound as the main component is employed, the amorphous selenium may be doped with: an alkali metal element such as Li, Na, K, Cs, and Rb, at a concentration within a range from 0.0007 atomic ppm to 0.0035 atomic ppm to impart high charge transport properties as described in the present specification; a fluoride such as LiF, NaF, KF, CsF, and RbF, at a concentration within a range from 0.01 atomic ppm to 1000 atomic ppm; or a group IV/group V element such as P, As, and Sb, at a concentration within a range from 10 atomic ppm to 1 atomic %. Alternatively, the amorphous selenium may be doped with a halogen element such as Cl, Br, and I at a concentration within a range from 1 atom ppm to 100 atomic ppm. It is particularly preferable to use amorphous selenium doped with As at a concentration within a range from 10 atomic ppm to 200 atomic ppm; amorphous selenium containing As within a range from 0.2 atomic % to 1 atomic % and doped with Cl at a concentration within a range from 5 atomic ppm to 100 atomic ppm; amorphous selenium containing Na at a concentration within a range from 0.0007 atomic ppm to 0.0035 atomic ppm to impart high charge transport properties as described in the present specification; amorphous selenium containing Na at a concentration within a range from 0.0007 atomic ppm to 0.0035 atomic ppm and As at a concentration within a range from 0.1 atomic % and 0.5 atomic %; or amorphous selenium having a coordinate b number of 1.95+0.02.

The readout photoconductive layer 4 is to be of a thickness that enables sufficient absorption of the readout light, while also enabling charges generated therein by irradiation of the readout light to be drifted by the electrical fields formed by the charges accumulated in the charge accumulating layer 3. The thickness of the readout photoconductive layer 4 is preferably within a range from 1 µm to 30 µm.

(Crystallization Preventing Layers)

The crystallization preventing layers are provided between the recording photoconductive layer and the upper electrode, and between the readout photoconductive layer and the lower electrode layer. From the viewpoint of preventing crystallization, it is preferable for amorphous selenium doped with As at a range from 1 atomic % to 20 atomic %, amorphous selenium doped with S, Te, P, Sb, or Ge at a range from 1 atomic % to 10 atomic %, amorphous selenium doped with the aforementioned elements and other elements, or $As_2S_3$ or $As_2Se_3$, which have higher crystallization temperatures, to be employed as the material for the crystallization preventing layers. Further, from the viewpoint of preventing positive hole injection from the electrode layers, it is preferable to dope the amorphous selenium with an alkali metal, such as Li, Na, K, Rb, and Cs, or with molecules of LiF, NaF, KF, RbF, CsF, LiCl, NaCl, KCl, RbF, CsF, CsCl, and CsBr at a range from 10 atomic ppm to 5000 atomic ppm. On the other hand, from the viewpoint of preventing electron injection, it is preferable to dope the amorphous selenium with a halogen element such as Cl, I, and Br, or with $In_2O_3$ at a concentration within a range from 10 atomic ppm to 5000 atomic ppm.

It is preferable for the thickness of the crystallization preventing layers to be provided at the interfaces of the electrode layers to be within a range from 0.05 µm to 1 µm, in order to sufficiently perform the aforementioned functions.

(Upper Coating Layer, Lower Coating Layer)

It is preferable for the upper coating layer and the lower coating layer to have rectifying properties, in order to reduce dark current and leaked current. It is preferable for the upper coating layer and the lower coating layer to have hole blocking properties when a positive biasing voltage is applied to the upper electrode, and to have electron blocking properties when a negative biasing voltage is applied. It is preferable for the resistance of the upper coating layer and the lower coating layer to be $10^{-8}\Omega$ or greater, and for the film thicknesses thereof to be within a range from 0.01 µm to 10 µm.

In the case that the layer is to have electron blocking properties, a layer having a composition such as $Sb_2S_3$, SbTe, ZnTe, CdTe, SbS, AsSe, or $As_2S_3$, or an organic polymer layer may be employed. It is preferable for layers formed by inorganic materials to be employed by adjusting the carrier selecting properties by changing the compositions thereof from their stoichiometric compositions, or by forming a multiple component composition from two or greater elements of the same group. It is preferable for layers formed by organic polymers to be formed by positive hole transport polymer materials, which include a pendant portion having a charge transport base, such as PVK. Alternatively, low molecular weight positive hole transport materials may be mixed into insulative polymers, such as polycarbonate, polystyrene, polyimide, and polycycloolefin. Preferred examples of the low molecular weight positive hole transport materials include: oxazole derivatives; triphenyl methane derivatives; hydrazone derivatives; and triphenyl amine derivatives. Specific examples include: NPD; TPD; PDA; m-MTDATA; 2-TNATA; and TPAC.

In the case that the layer is to have positive hole blocking properties, a layer formed by inorganic materials, such as CdS, $CeO_2$, $Ta_2O_5$, and SiO or by an organic polymer. It is preferable for layers formed by inorganic materials to be employed by adjusting the carrier selecting properties by changing the compositions thereof from their stoichiometric compositions, or by forming a multiple component composition from two or greater elements of the same group. Low molecular weight electron transport materials may be mixed into insulative polymers, such as polycarbonate, polystyrene, polyimide, and polycycloolefin. Preferred examples of the low molecular weight electron transport materials are mixtures of: trinitro fluorine and derivatives thereof; dipheno quinone derivatives; bis naphtyl quinone derivatives; oxazole derivatives; triazole derivatives; and carbon clusters such as $C_{60}$ (fullerene) and $C_{70}$. Specific examples include: TNF; DMDB; PBD; and TAZ.

Meanwhile, thin insulative polymer layers may be favorably employed as alternatives. Preferred examples of such insulative polymer layers are acrylic resins, such as: parylene; polycarbonate; PVA; PVP; PVB; polyester resin; and polymethyl methacrylate. In this case, it is preferable for the film thickness of the insulative polymer layers to be 2 µm or less, and more preferably 0.5 µm or less.

(Lower Electrodes)

The lower electrodes are of a comb electrode structure, in which electrodes for reading out signals are provided alternately as stripes. It is necessary for the lower electrodes to be transparent, because light is irradiated therethrough from the rear surfaces thereof. In addition, it is necessary to secure flatness in order to avoid damage due to electrical field concentration during application of high voltage. Examples of materials for the lower electrodes include ITO (Indium Tin Oxide) and IZO (Indium Zinc Oxide). In the case of IZO, the preferred thickness is 0.2 µm, and the preferred flatness is Ra=1 nm.

(Surface Protecting Layer)

It is necessary for the electrode surface to be insulated such that the electrode surface does not contact the atmosphere at all. The surface protecting layer is of a structure that covers the electrode surface in close contact therewith. It is necessary for the surface protecting layer to have an electrical breakdown strength greater than the applied electrical potential. In addition, it is necessary for the surface protecting layer to be a member that transmits radiation, in view of the function of the radiation detector. Accordingly, vapor deposition or solvent coating of an insulative polymer is a preferred method for producing the surface protecting layer which has high coatability, electrical breakdown strength, and radiation transmittance. Specific examples of such a method include forming a film of room temperature curing epoxy resin, polycarbonate resin, polyvinyl butyral resin, polyvinyl alcohol resin, acrylic resin, or a polyparaxylene derivative by the CVD method. Among these examples, forming a film of room temperature curing epoxy resin, and a polyparaxylene derivative by the CVD method are preferred, and forming a film of a polyparaxylene derivative by the CVD method is particularly preferred. It is preferable for the film thickness of the surface protecting layer to be within a range from 10 µm to 1000 μm, and more preferable for the film thickness of the surface protecting layer to be within a range from 20 μm to 100 μm.

As described above, the radiation detector of the present invention comprises the recording photoconductive layer and the electrodes provided on both sides of the recording photoconductive layer. In the radiation detector of the present invention, electric charges, which are generated within the recording photoconductive layer when radiation is irradiated thereon while a predetermined biasing voltage is being applied between the electrodes, are read out as electric signals. The recording photoconductive layer is formed by amorphous selenium that contains alkali metal elements within a range from 0.0007 atomic ppm to 0.0035 atomic ppm. Therefore, the positive hole transport properties can be greatly improved while maintaining high electron transport properties. The electron transport properties are improved over pure selenium, which is said to have great fluctuations in electron transport properties, and further, the positive hole transport properties are improved, resulting in a radiation detector which is superior in charge transport properties.

Note that the recording photoconductive layer of the present invention, formed by amorphous selenium that contains alkali metal elements within a range from 0.0007 atomic ppm to 0.0035 atomic ppm, may also be applied to a case in which the TFT readout method is employed to read out signals using a TFT substrate. In this case as well, the processes that occur within the amorphous selenium recording photoconductive layer when X-ray information is converted to charge information is the same as those in the case of the optical readout method described above. That is, high charge transport properties can be obtained for both electrons and positive holes, and thereby, it becomes possible to maximize sensitivity.

What is claimed is:

1. A radiation detector, comprising:

a recording photoconductive layer; and electrodes provided on both sides of the photoconductive layer;

electric charges, which are generated within the recording photoconductive layer when radiation is irradiated thereon while a predetermined biasing voltage is being applied between the electrodes, being read out as electric signals; and the recording photoconductive layer being formed by amorphous selenium that contains alkali metal elements within a range from 0.0007 atomic ppm to 0.0035 atomic ppm.

2. A radiation detector as defined in claim 1, wherein:

the recording photoconductive layer further contains As within a range from 0.1 atomic % to 0.5 atomic %.

3. A radiation detector as defined in claim 1, further comprising:

a layer formed by amorphous selenium provided adjacent to the recording photoconductive layer at least one side thereof, having a thickness within a range from 0.2 μm to 2 μm and containing As within a range from 2 atomic % to 14 atomic %.

* * * * *